(12) United States Patent
Zhou et al.

(10) Patent No.: US 10,613,554 B2
(45) Date of Patent: Apr. 7, 2020

(54) CLOSED CIRCULATION SYSTEM FOR PRODUCTION OF A POLYMER SOLUTION AND IMPROVING OPERATING EFFICIENCY OF A GAS DRAINAGE PUMP USED IN A COAL MINE

(71) Applicants: CHINA UNIVERSITY OF MINING AND TECHNOLOGY, Xuzhou (CN); JIANGSU XINCHUANG SAFETY TECHNOLOGY RESEARCH INSTITUTE CO., LTD, Xuzhou (CN)

(72) Inventors: Fubao Zhou, Xuzhou (CN); Yifan Zhang, Xuzhou (CN); Xiaolin Song, Xuzhou (CN)

(73) Assignees: CHINA UNIVERSITY OF MINING AND TECHNOLOGY, Xuzhou (CN); JIANGSU XINCHUANG SAFETY TECHNOLOGY RESEARCH INSTITUTE CO., LTD, Xuzhou (CN)

( * ) Notice: Subject to any disclaimer, the term of this patent is extended or adjusted under 35 U.S.C. 154(b) by 0 days.

(21) Appl. No.: 16/318,707

(22) PCT Filed: Dec. 4, 2017

(86) PCT No.: PCT/CN2017/114450
§ 371 (c)(1),
(2) Date: Jan. 18, 2019

(87) PCT Pub. No.: WO2019/010907
PCT Pub. Date: Jan. 17, 2019

(65) Prior Publication Data
US 2019/0286174 A1    Sep. 19, 2019

(30) Foreign Application Priority Data
Jul. 10, 2017 (CN) .......................... 2017 1 0554532

(51) Int. Cl.
*G05D 11/13* (2006.01)
*E21F 7/00* (2006.01)
(Continued)

(52) U.S. Cl.
CPC .......... *G05D 11/131* (2013.01); *B01F 1/0011* (2013.01); *B01F 5/104* (2013.01);
(Continued)

(58) Field of Classification Search
CPC ....... G05D 11/131; F04B 23/08; F04B 45/04; F04B 43/0081; F04B 23/02; F04B 15/00;
(Continued)

(56) References Cited

U.S. PATENT DOCUMENTS 5,222,807 A * 6/1993 Gaddis ...................... B01F 1/00
366/160.1
9,605,512 B2 * 3/2017 Lin ............................. E21F 7/00
(Continued)

FOREIGN PATENT DOCUMENTS

CN    104358514 A    2/2015
CN    205275355 U    6/2016
(Continued)

*Primary Examiner* — Charles Cooley
(74) *Attorney, Agent, or Firm* — Bayramoglu Law Offices LLC

(57) ABSTRACT

Closed circulation system for production of and continuously preparing a polymer solution, including a pneumatic stirrer inside and a charging hopper at a top of a drag-reducing polymer solution tank, a gas drainage pump, a submersible pump, and a compressed air pipe connected to a pneumatic diaphragm pump. A liquid inlet of the pneumatic diaphragm pump is connected to a liquid outlet of the drag-reducing polymer solution tank, and the gas drainage pump liquid discharge pipe and a liquid outlet pipe of the diaphragm pump leads to a circulation water pool; a liquid outlet of the submersible pump is connected to a liquid inlet (Continued)

of the drag-reducing polymer solution tank and a liquid inlet of the gas drainage pump respectively through a three way pipe. The pneumatic stirrer and pneumatic diaphragm pump operate at speeds, so the drag-reducing polymer solution is mixed uniformly and fed into the circulation water pool.

2 Claims, 1 Drawing Sheet

(51) Int. Cl.
  *F04B 15/00*  (2006.01)
  *F04B 23/02*  (2006.01)
  *F04B 23/08*  (2006.01)
  *F04B 43/00*  (2006.01)
  *F04B 45/04*  (2006.01)
  *F04B 53/04*  (2006.01)
  *F04C 19/00*  (2006.01)
  *F04B 43/06*  (2006.01)
  *B01F 5/10*  (2006.01)
  *B01F 1/00*  (2006.01)
  *B01F 7/16*  (2006.01)

(52) U.S. Cl.
  CPC ............... *B01F 7/16* (2013.01); *E21F 7/00* (2013.01); *F04B 15/00* (2013.01); *F04B 23/02* (2013.01); *F04B 23/021* (2013.01); *F04B 23/08* (2013.01); *F04B 43/0081* (2013.01); *F04B 43/06* (2013.01); *F04B 45/04* (2013.01); *F04B 53/04* (2013.01); *F04C 19/00* (2013.01); *F04B 2205/09* (2013.01); *F04C 2210/12* (2013.01); *F04C 2210/20* (2013.01)

(58) Field of Classification Search
  CPC ...... F04B 23/021; F04B 2205/09; E21F 7/00; B01F 7/16; B01F 1/0011; B01F 5/104
  See application file for complete search history.

(56) References Cited

U.S. PATENT DOCUMENTS

2012/0264068 A1* 10/2012 Hughes .................... F23G 5/46
                             431/2
2019/0286174 A1* 9/2019 Zhou ................... F04B 43/0081

FOREIGN PATENT DOCUMENTS

| | | |
|---|---|---|
| CN | 205349409 U | 6/2016 |
| CN | 107152400 A | 9/2017 |
| JP | H0321306 A | 1/1991 |
| KR | 20100024153 A | 3/2010 |
| WO | WO-9954588 A1 * 10/1999 ............ B01F 5/104 |

* cited by examiner

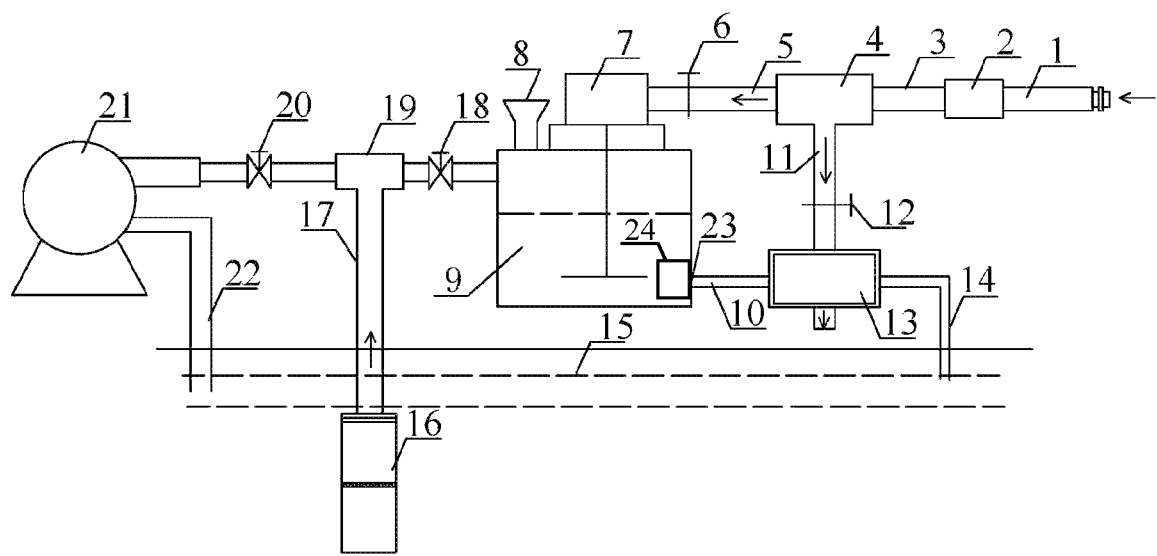

CLOSED CIRCULATION SYSTEM FOR PRODUCTION OF A POLYMER SOLUTION AND IMPROVING OPERATING EFFICIENCY OF A GAS DRAINAGE PUMP USED IN A COAL MINE

CROSS REFERENCE TO RELATED APPLICATIONS

This application is the national phase entry of International Application No. PCT/CN2017/114450, filed on Dec. 4, 2017, which is based upon and claims priority to Chinese Patent Application No. 201710554532.3, filed on Jul. 10, 2017, the entire contents of which are incorporated herein by reference.

TECHNICAL FIELD

The present invention relates to a closed circulation system for improving operating efficiency of a gas drainage pump, and is especially applicable to a gas drainage system of an underground mobile pump station for a coal mine.

BACKGROUND

The Code for Design of the Gas Drainage Engineering of Coal Mine stipulates: a gas drainage system must be established for a highly gassy mine or a mine having a coal and gas outburst danger coal seam mined. A gas drainage pump, as a power source of the drainage system, plays an important role in efficient and safe production of the mine. However, the gas drainage pump has low operating efficiency and high energy consumption with an actual efficiency of only 10% to 40% but ¼ of the total power consumption of the coal mine. This issue is highly unaccommodated to energy saving and emission reduction requirements of the country for coal mines and the current situation of energy shortage in our country.

Accordingly, engineers and technicians in the art propose a "Method for Improving Efficiency of Gas Drainage Liquid-Ring Vacuum Pump by Using Polymer Drag Reducer", that is, a method of injecting a polymer drag reducer into a circulation water pool and inhibiting the eddy current loss of a gas drainage pump using a specific chain structure of a drag-reducing solution, so as to greatly improve the efficiency of the pump. However, polymer drag reducers for mines have poor solubility and large consumption, need to be stirred thoroughly to achieve a desirable drag reduction effect, and need to be added quantitatively and periodically. The existing device cannot be completely docked with an underground pump station system for a coal mine, and cannot meet requirements that the drag reducer can be continuously prepared and is ready to use once prepared, causing complicated working procedures and large consumption of human and material resources, which is disadvantageous to promotion and application of the technology.

SUMMARY

The objective of the present invention is, in order to overcome the deficiencies in the existing technology, to provide a closed circulation system for improving operating efficiency of a gas drainage pump which is simple, convenient to operate, reliable in performance, and water-saving, can work continuously and can sufficiently dissolve a drag reducer.

Technical solution: a closed circulation system for improving operating efficiency of a gas drainage pump includes a pneumatic diaphragm pump, a drag-reducing polymer solution tank, a gas drainage pump, a submersible pump, and a compressed air pipe. A liquid inlet of the pneumatic diaphragm pump is connected to a liquid outlet of the drag-reducing polymer solution tank, and a liquid outlet pipe of the pneumatic diaphragm pump leads to a circulation water pool. The drag-reducing polymer solution tank is provided with a pneumatic stirrer internally, and a charging hopper at the top. A liquid outlet of the submersible pump is connected to a liquid inlet of the drag-reducing polymer solution tank and a liquid inlet of the gas drainage pump respectively through a three way pipe, and a liquid discharge pipe of the gas drainage pump is connected to the circulation water pool. The compressed air pipe is connected to the pneumatic diaphragm pump and the pneumatic stirrer respectively through a three way pipe to provide power to them.

The liquid outlet of the drag-reducing polymer solution tank is provided with a steel wire mesh 24, and the steel wire mesh 24 has a mesh count of 30 to 50.

The circulation system for improving operating efficiency of a gas drainage pump in the present invention is applicable to an underground mobile gas drainage pump station system for a coal mine and can be completely docked with the underground pump station system. The present invention uses an existing air compression system to provide power to sufficient dissolution and addition of a polymer drag reducer; the system is connected to a compressed air pipeline and a water supply pipeline of a submersible pump, the drag reducer can be continuously prepared and is ready to use once prepared, it is not needed to stop halfway to prepare a high-concentration drag-reducing solution, and continuous operation can be realized, and meanwhile, the difficulty in controlling the concentration of the drag reducer in the circulation water pool due to connection of external water from the underground water pipe can be avoided, and a lot of water is saved, so as to realize closed circulation; pressure-regulating valves and regulating valves are used to conveniently realize control on the stirring speed of the stirrer and control on the flow of the injected drag-reducing solution, so that the liquid level in the drag-reducing polymer solution tank is balanced; a steel wire mesh is disposed at the place of connection between the drag-reducing polymer solution tank and the pipeline, so that the undissolved drag reducer can be prevented from entering the circulation water pool to affect the drag reduction effect; the present invention has a small size, does not contain electrical elements, is safe and reliable in underground use, and can greatly improve the operating efficiency of the gas drainage pump.

BRIEF DESCRIPTION OF THE DRAWINGS

The FIGURE is a schematic view of a closed circulation system for improving operating efficiency of a gas drainage pump in the present invention.

In the drawing: 1. compressed air pipe; 2. pipeline diameter change; 3. transparent rubber hose I; 4. pneumatic rubber hose three way pipe; 5. transparent rubber hose II; 6. pressure-regulating valve I; 7. pneumatic stirrer; 8. charging hopper; 9. drag-reducing polymer solution tank; 10. connecting pipe; 11. transparent rubber hose III; 12. pressure-regulating valve II; 13. pneumatic diaphragm pump; 14. liquid outlet pipe of pneumatic diaphragm pump; 15. circulation water pool; 16. submersible pump; 17. liquid outlet pipe of submersible pump; 18. regulating valve I; 19. three way pipe; 20. regulating valve II; 21. gas drainage pump; 22. liquid discharge pipe of gas drainage pump; 23 a liquid outlet with a steel wire mesh 24 of the drag-reducing polymer solution tank.

DETAILED DESCRIPTION OF THE EMBODIMENTS

The present invention is further described below with reference to the drawing and embodiment.

As shown in the drawing, the system mainly consists of a compressed air pipe 1, a pneumatic diaphragm pump 13, a drag-reducing polymer solution tank 9, a submersible pump 16, and a gas drainage pump 21. A liquid inlet of the pneumatic diaphragm pump 13 is connected to a liquid outlet 23 of the drag-reducing polymer solution tank through a connecting pipe 10, and a liquid outlet pipe 14 of the pneumatic diaphragm pump leads to a circulation water pool 15. The drag-reducing polymer solution tank 9 is provided with a pneumatic stirrer 7 internally, and a charging hopper 8 at the top. A liquid outlet pipe 17 of the submersible pump 16 is connected to a liquid inlet of the drag-reducing polymer solution tank and a liquid inlet of the gas drainage pump respectively through a three way pipe 19, and two outlets of the three way pipe are respectively provided with a regulating valve I 18 and a regulating valve II 20. A liquid discharge pipe 22 of the gas drainage pump is connected to the circulation water pool 15. The compressed air pipe 1 is sequentially connected to a pipeline diameter change 2, a transparent rubber hose I 3, and a pneumatic rubber hose three way pipe 4. One outlet of the pneumatic rubber hose three way pipe 4 is connected to the pneumatic stirrer 7 through a transparent rubber hose II 5 and a pressure-regulating valve I. The other outlet of the pneumatic rubber hose three way pipe 4 is connected to the pneumatic diaphragm pump 13 through a transparent rubber hose III 11 and a pressure-regulating valve II 12.

Working principle: the pressure-regulating valve II 12 is closed, the pressure-regulating valve I 6 is opened, high-pressure air in the compressed air pipe 1 drives the pneumatic stirrer 7 to rotate at high speed, and meanwhile, a polymer drag reducer is added to the drag-reducing polymer solution tank 9 through the charging hopper 8. After the drag reducer is sufficiently dissolved, the pressure-regulating valve II 12 is opened, so that part of the high-pressure air in the compressed air pipe 1 drives the pneumatic diaphragm pump 13 to operate to discharge a dissolved drag-reducing polymer solution into the circulation water pool 15 through the connecting pipe 10 and the liquid outlet pipe 14 of the pneumatic diaphragm pump, and meanwhile, the regulating valve I 18 is opened, so that part of water in the liquid outlet pipe 17 of the submersible pump flows into the drag-reducing polymer solution tank 9. The relative opening between the pressure-regulating valve II 12 and the regulating valve I 18 is adjusted, so that the liquid level in the drag-reducing polymer solution tank 9 is kept balanced. In this process, quantitative charging is still continuously performed, so that the concentration of the solution in the drag-reducing polymer solution tank 9 is kept constant. The other part of water in the liquid outlet pipe 17 of the submersible pump is supplied to the gas drainage pump 21 through a pipeline, and the submersible pump 16 also has a function of stirring and mixing the drag-reducing solution uniformly the second time. The liquid discharge pipe 22 of the gas drainage pump feeds the liquid discharged from the pump to the circulation water pool. When the concentration of the polymer drag reducer in the circulation water pool reaches the optimal drag reduction concentration, charging is stopped, and at this time, the operating efficiency of the gas drainage pump can be greatly improved. In this way, the closed circulation of the working medium of the gas drainage pump is realized.

What is claimed is:

1. A closed circulation system for improving an operating efficiency of a gas drainage pump, comprising a pneumatic diaphragm pump, a drag-reducing polymer solution tank, the gas drainage pump, a submersible pump, and a compressed air pipe, wherein a liquid inlet of the pneumatic diaphragm pump is connected to a liquid outlet of the drag-reducing polymer solution tank, and a liquid outlet pipe of the pneumatic diaphragm pump leads to a circulation water pool; a pneumatic stirrer is provided inside the drag-reducing polymer solution tank a charging hopper is provided at a top of the drag-reducing polymer solution tank; a liquid outlet of the submersible pump is connected to a liquid inlet of the drag-reducing polymer solution tank and a liquid inlet of the gas drainage pump respectively through a first three way pipe, and a liquid discharge pipe of the gas drainage pump is connected to the circulation water pool; and the compressed air pipe is connected to the pneumatic diaphragm pump and the pneumatic stirrer respectively through a second three way pipe.

2. The closed circulation system for improving the operating efficiency of the gas drainage pump according to claim 1, wherein the liquid outlet of the drag-reducing polymer solution tank is provided with a steel wire mesh, and the steel wire mesh has a mesh count of 30 to 50.

* * * * *